April 27, 1926.
F. KUSTERLE
CORNER FASTENING
Filed March 26, 1920
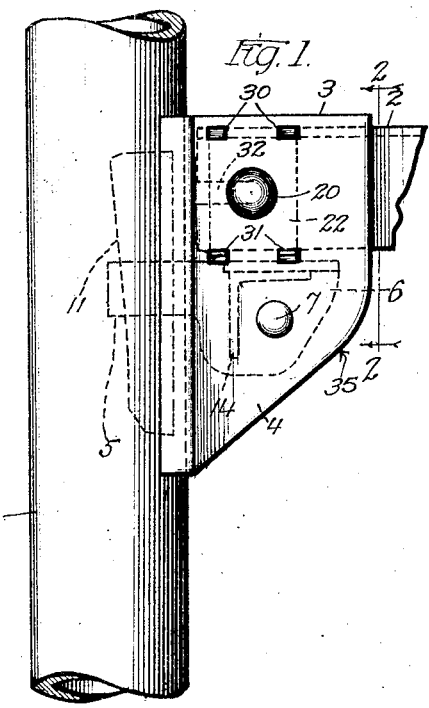
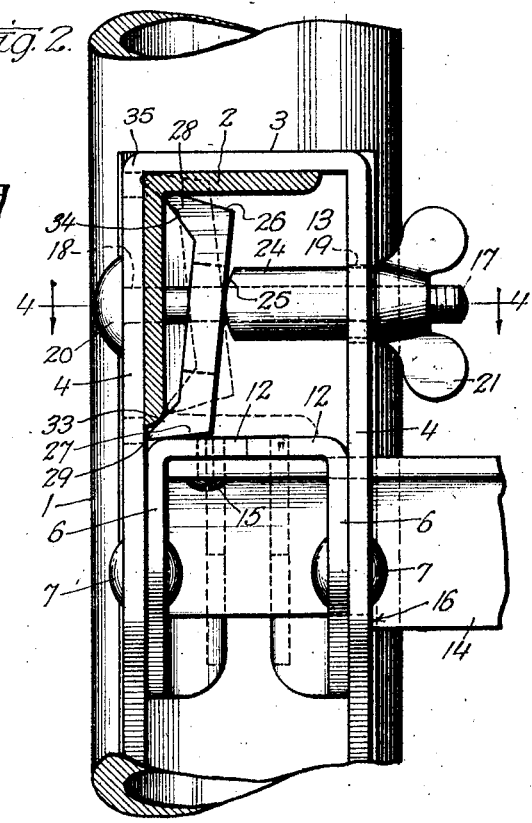
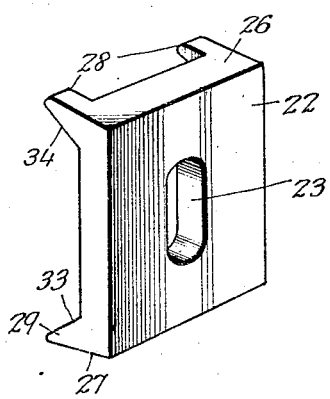
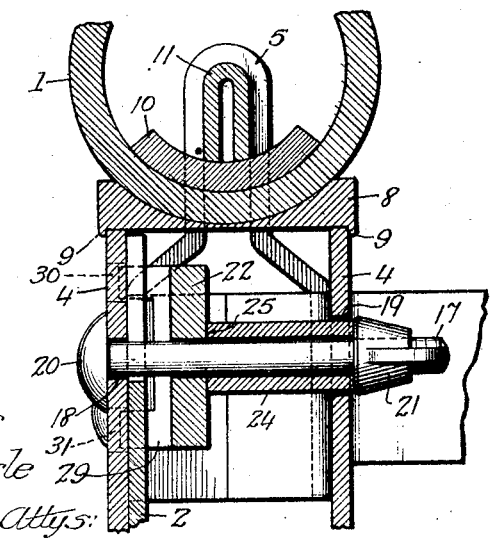
Inventor
Frank Kusterle
By Fisher, Towle, Clapp & Soans, Attys.

Patented Apr. 27, 1926.

1,582,829

UNITED STATES PATENT OFFICE.

FRANK KUSTERLE, OF KENOSHA, WISCONSIN, ASSIGNOR TO SIMMONS COMPANY, OF KENOSHA, WISCONSIN, A CORPORATION OF DELAWARE.

CORNER FASTENING.

Application filed March 26, 1920. Serial No. 369,051.

*To all whom it may concern:*

Be it known that I, FRANK KUSTERLE, a citizen of the United States, residing at Kenosha, in the county of Kenosha and State of Wisconsin, have invented certain new and useful Improvements in Corner Fastenings, of which the following is a specification.

My invention has reference more particularly to a device for detachably securing the end of a longitudinal member to another member or part and is particularly adapted for use in furniture construction, as for example, in beds wherein an angle iron side rail is connected to a post or bed-end.

The principal objects of my invention are to provide improved means for detachably securing the end of a longitudinal member of angular cross section, such as an angle iron, in a socket; to enable said member to be readily secured in a socket in reversed positions; to effect such reversed connection without removing or reversing the locking device; to clamp the angle iron cornerwise in a socket by a rocking or tilting movement of a single locking element; to retain the locking member assembled in place when the angle iron is released, and in general to provide improved locking means of this character which is simple and inexpensive and of compact form, and which may be conveniently operated to securely clamp the end of an angle iron or similar member in a socket.

In the drawings, Fig. 1 is a side view of a fragmentary portion of a post with an angle iron secured endwise thereunto in accordance with my invention. Fig. 2 is an enlarged view of the structure shown in Fig. 1 taken on the side line 2—2. Fig 3 is a perspective view of the locking block, and Fig. 4 a sectional view on the line 4—4 of Fig. 2.

Referring to the drawings, the reference numeral 1 indicates a fragmentary portion of a post such as the post of a bed-end and 2 a fragmentary portion of an angle iron side rail of a bed, which is detachably connected to the post 1.

For the purpose of affording such connection, the post 1 has a bracket or socket member, indicated as a whole at 35, on the side thereof, which may be of any suitable form or construction and secured to the post in any desired manner. This socket, in the illustrated embodiment of my invention, comprises a plate bent in inverted U-shape to afford a top wall 3 and a pair of spaced depending legs 4. A looped strap 5 has enlarged ears 6 at each end, spread apart as shown, so as to engage against the inner surface of the legs 4 to which they are secured by rivets 7. The bight portion of the loop member 5 is contracted to a less width than the distance between the ears 6 and is inserted through an aperture provided therefor in the post 1. A block 8 conforming on its inner surface to the contour of the post 1 and provided on its outer surface with spaced marginal ribs 9 for engaging the legs 4 therebetween, is interposed between the post 1 and the socket member 35. A curved plate 10 is inserted on the loop 5 inside the post 1 and the socket clamped onto the post by a tapered pin 11, which is driven into the loop 5 and bears against the inner surface of the plate 10.

The ears 6 are located between the legs 4 at a distance from the top wall 3, as shown particularly in Fig. 2, and the upper extremities of the ears are bent inwardly as indicated at 12 so as to meet at a center line and form the bottom wall of the socket opening 13.

In bed construction, it is customary to provide a cross-brace or reinforcing member connecting the two posts of the bed end adjacent the point where the side rails are secured thereto, and in the present structure, I provide an angle iron 14 for this purpose. There is a socket member or bracket 35 on each post of the bed-end, and each end of the angle iron 14 is reduced to afford shoulders 16, and the reduced end secured to the respective socket member 35 in the following manner:

The leg 4 at the inner side of each socket member and the ear 6 attached thereto, is provided with an angular slot corresponding to the cross sectional form of the reduced end of the angle iron 14, and positioned so that said end may be inserted through the angular slot directly under and with one flange thereof engaged by the inturned portions 12 of the ears 6. The portion 12 farthest distant from the side of the socket through which the end of the angle iron 14 is inserted, is secured to the upper flange of the angle iron 14, by a cap-screw 15 or other suitable fastening and this connection, together with the shoulders 16 of the angle iron 14 serves to tie together the two legs 4 of the socket in proper spaced relation.

Extending transversely through the socket 13, substantially midway between the top and bottom walls thereof, is a bolt 17 which is inserted through perforations 18 and 19 in the opposite walls 4 of the socket, the latter perforations being enlarged to admit the sleeve 24 which telescopes the bolt 17. The head 20 of the bolt engages against the exterior surface of one of the walls 4 and the opposite end of the bolt projects outside the socket member 35, and has a wing nut 21 threaded thereon, which through the interposed sleeve 24, serves to adjust the locking member 22. This locking member has a perforation 23 through which the bolt 17 passes, said perforation being elongated as shown to permit shifting of the locking member crosswise of the bolt, and the inner end of the sleeve 24 which bears against the back of the locking member 22 is rounded, as at 25, to facilitate angular disposition of the locking member with reference to the sleeve.

The angle iron side rail 2 is preferably arranged so that it may be clamped in the socket 13 in reversed positions, one of which positions is illustrated in full lines in Fig. 2 and the other of which is illustrated therein in dotted lines, and the block 22 is adapted to clamp the angle iron in the socket in either of these positions. To this end the block 22 has the upper and lower ends or edges beveled slightly as at 26 and 27 respectively, and at each end are a pair of correspondingly spaced wedge-shaped projections, those at the upper end being indicated at 28, and at the lower end at 29. The outer wall 4 of the socket 13 against which the angle iron 2 is clamped, has upper and lower apertures 30 and 31, respectively, corresponding to the projections 28 and 29, to admit said projections therein, if necessary, in the operation of clamping the angle iron in the socket.

The elongation of the opening 23 in the block 22 through which the bolt 17 is passed, permits vertical adjustment of the block 22 in the socket, so that the block is free to assume the required position for locking the angle iron in either of the two positions in which it is capable of being locked in the socket 13. To enable the end of the angle iron 2 to be fully inserted in the socket 13 and pass the bolt 17, the upright flange of the angle iron is notched or slotted at 32, so as to straddle the bolt 17 as shown by dotted lines in Fig. 1.

In utilizing this lock, assuming that the angle iron is inserted in the socket in the position shown in full lines in Fig. 2, the locking block 22 will rest upon the bottom wall of the socket and the upper flange of the angle iron extends over the upper end of the locking block. By turning the wing nut 21 onto the bolt 17, the inner end of the sleeve 24 is caused to bear against the face of the block 22, forcing same over to the left (looking at Fig. 2), and the elongation of the opening 23 and the curvature of the inner end of the sleeve 24 permits the block to automatically adjust itself according to the opposition encountered by the projections 28 and 29. The upper projections 28, engaging under the upper flange of the angle iron holds same adjacent the top of the socket and as pressure is applied to the back of the block, the lower projections are forced under the lower edge of the vertical flange of the angle iron and the inclined faces 33 of these projections wedge the angle iron upwardly so that the upper flange is clamped tightly against the upper wall of the socket. At the same time, this wedge action of the projections 29 against the lower edge of the vertical flange of the angle iron, together with the direct lateral pressure of the upper projections 28 against this flange, serve to clamp the vertical flange of the angle iron tightly against the side wall 4 of the socket, so that the pressure applied by the turning of the wing-nut 21 onto the bolt 17, results in a lateral and vertical thrust against the angle iron and forces the latter corner-wise into the socket with the two flanges of the angle iron clamped tightly against the corresponding walls of the socket.

It will be observed that the openings 31 in the wall of the socket are positioned adjacent the location of the projections 29 when the angle iron is clamped in the socket in the position shown in full lines in Fig. 2, and permits said projections to be forced under the edge of the vertical flange of the angle iron without interference from the wall of the socket.

When the angle iron is clamped in the socket in the position shown by the dotted lines in Fig. 2, the locking block 22 assumes the position in which it is shown in dotted lines in said figure, and the operation of clamping the angle iron in this position is effected in a similar manner to that just described. It is to be understood, however, that it is unnecessary to reverse the position of the block 22 in the socket when the angle iron is reversed, but the locking block merely assumes a slightly elevated position and the inclined surfaces 34 of the upper projections 28 are brought to bear against the upper edge of the vertical flange of the angle iron and the lower projections 29 then bear directly against the vertical flange, and the pressure applied by the wing-nut 21 results in a lateral and downward pressure against the angle iron, so as to force the same corner-wise into a lower corner of the socket, and clamp the flanges of the angle-iron against the lateral wall and lower wall of the socket.

While I have shown and described my invention in a certain form, I am aware that various changes and modifications may be made without departing from the principles of my invention, the scope of which is to be determined by the appended claims.

I claim as my invention:

1. In a device of the class described the combination with an angle iron, of an end fastening therefor comprising a pair of abutments adapted to receive the angle iron cornerwise therebetween, and a locking member wedgingly engaging and pivoting against the angle iron respectively at transversely spaced points.

2. In a device of the class described, the combination with an angle iron, of an end fastening therefor comprising two abutments adapted to receive the angle iron cornerwise therebetween, and a locking member bearing against the face of one flange of the angle iron to clamp said flange against its abutment and having a wedge engagement with the edge of said flange to clamp the other flange of the angle iron against the other abutment.

3. In a corner fastening, the combination with an angle iron, of a corner seat therefor, and a locking member having spaced parts engaging respectively against the inner face and the edge of one of the flanges of the angle iron at transversely spaced points for locking the angle iron in the corner seat, and a threaded member for operating the locking member to effect such engagement.

4. In a corner fastening, the combination of a socket having a corner seat for an angle iron, said socket comprising angularly related abutments adapted to be engaged by respective flanges of the angle iron, a locking member in the socket having a portion bearing against the face of one of the flanges of the angle iron to clamp said flange against its abutment, and having a portion engaging the edge of said flange to clamp the other flange against its abutment.

5. In a corner fastening, the combination with an angle iron, of a socket having optional corner seats for the angle iron, a clamping bolt and a locking member loosely mounted on said bolt and adjustable angularly with reference to a flange of the angle iron for locking the angle iron in either optional corner seat.

6. In a device of the class described, the combination with an angle iron, of a corner seat in which the angle iron is adapted to be secured, and securing means comprising a locking member adapted to fulcrum against the face of a flange of the angle iron and wedge against the edge of said flange for clamping both flanges of the angle iron against respective portions of the corner seat.

7. In a corner fastening the combination of an angle iron, a socket adapted to receive the end of the angle iron therein, a plate having laterally extending projections at opposite extremities thereof, a bolt extending through the plate between said extremities and a threaded member on the bolt engaging the plate and operable to press the projection at one extremity of the plate against the face of one of the flanges of the angle iron and wedge the other projection against the edge of said flange.

8. In a corner fastening, the combination of a socket, a locking member loosely mounted in the socket, an angle iron inserted in the socket and serving as a bearing for the locking member, and an operating member for rocking the locking member on said bearing to cause a portion of the locking member remote from the bearing to wedgingly engage an edge of the angle iron for clamping the latter in the socket.

9. In a corner fastening the combination of an angle iron, a socket for the end of the angle iron, a bolt extending transversely through the socket, a plate loosely mounted on the bolt and having lateral projections at the top and bottom thereof, one of which is tapered and a member threaded on the bolt and adapted to apply pressure to the plate so as to force the tapered projection against the edge of a flange of the angle iron and the other projection against the face of said flange at a distance from the edge for clamping the angle iron in the corner of the socket.

FRANK KUSTERLE.